(12) United States Patent
Finch (10) Patent No.: US 7,121,575 B2
(45) Date of Patent: Oct. 17, 2006

(54) MOTORCYCLE TRAILER

(76) Inventor: Thomas E. Finch, 6929 Old Spring Branch Rd., Spring Branch, TX (US) 78070

( * ) Notice: Subject to any disclaimer, the term of this patent is extended or adjusted under 35 U.S.C. 154(b) by 0 days.

(21) Appl. No.: 10/883,557

(22) Filed: Jul. 1, 2004

(65) Prior Publication Data
US 2006/0001230 A1    Jan. 5, 2006

(51) Int. Cl.
*B60D 1/50* (2006.01)
*B62J 7/04* (2006.01)

(52) U.S. Cl. .................. 280/489; 280/202; 280/204; 280/282; 296/168; D2/101

(58) Field of Classification Search ............. 280/202, 280/204, 489, 282; 296/168; D12/101
See application file for complete search history.

(56) References Cited

U.S. PATENT DOCUMENTS

| | | | | |
|---|---|---|---|---|
| 144,748 | A | * | 11/1873 | Weissberg .................. 404/29 |
| 2,159,671 | A | * | 5/1939 | Owen ........................ 296/168 |
| 2,309,766 | A | * | 2/1943 | Harroun et al. ........... 280/405.1 |
| 2,377,806 | A | * | 6/1945 | Oehler et al. ............. 280/489 |
| 2,396,576 | A | * | 3/1946 | Kelly ....................... 280/405.1 |
| 2,463,140 | A | * | 3/1949 | Bihn ........................ 280/484 |
| 2,634,986 | A | * | 4/1953 | McDaniel ................. 280/489 |
| 3,556,561 | A | * | 1/1971 | Gingue ..................... 280/489 |
| 4,195,861 | A | * | 4/1980 | Philipponi ................ 280/489 |
| 4,512,593 | A | * | 4/1985 | Ehrhardt ................... 280/460.1 |
| 4,536,001 | A |   | 8/1985 | Wagner |
| 5,240,273 | A | * | 8/1993 | Stead et al. ............... 280/489 |
| 5,520,404 | A | * | 5/1996 | Schulte ..................... 280/460.1 |
| 6,042,138 | A |   | 3/2000 | Shreck |

OTHER PUBLICATIONS http://adventuresportsproducts.com/components/products/view.php?image=MotorcycleMainPic4.
http://adventuresportsproducts.com/components/products/view.php?image=MotorcycleMainPic5.
http://www.amazingproducts.com/harley/cargo/mbt1.gif.
http://www.amazingproducts.com/harley/cargo/uct1.gif.
Motorcycle cargo trailers to pull behind your bike; http://www.discount-trailers.com/motorcycle_cargo_trailers.htm (pp. 1-3).
FoR BRo Trailer Models; http://www.forbro.com/models.html (pp. 1-4).
Lil Donk; http://www.honkytrailer.com/Lildonkpg1.htm.
Speedster; http://www.honkytrailer.com/speedmain.htm.
Kompact Kamp; http://www.inb.net/compactkamp/trailers.html (pp. 1-3).

(Continued)

*Primary Examiner*—Lesley D. Morris
*Assistant Examiner*—Marlon Arce-Diaz
(74) *Attorney, Agent, or Firm*—Charles W. Hanor. PC; Charles W. Hanor (57) ABSTRACT

A motorcycle trailer with an aerodynamic storage compartment and a two-wheel independent suspension. Swing arm suspensions for the wheels include swing arms pivotally mounted to the trailer above the wheel axle, wherein the swing arms are supported by wheel suspension shock absorbers. A suspension spring supported hitch design enables the motorcycle to rapidly move up and down independently of the trailer pitch velocity to reduce affecting the motorcycle. The aerodynamic storage compartment, the wheel suspension, and the suspension spring supported hitch help maintain a smooth ride for the motorcycle pulling the trailer and reduce the aerodynamic drag and associated fuel consumption and rear tire wear of the motorcycle, and the motorcycle aft frame fatigue.

4 Claims, 9 Drawing Sheets

OTHER PUBLICATIONS

Motorvation Engineering Trailer Photo; http://motorvation.com/cowboya.htm.
Motovation Engineering Trailer Photo Page; http://motorvation.com/ gnsilverb.htm.
Motorvation Engineering Trailer Photo page; http://motorvation.com/trpic18d. htm.
ZZ Trailer Motorcylce Cargo trialers—View our Models; http://www. zztrailer.com/models.html.
Ali-Lite Motorcycle Trailers—Deluxe Tourer; http://www.users.bigpond.com/gajmcdonald/alilite/Deluxe.htm.
Ali-Lite Motorcycle Trailers—Mid Tourer; http://www.users.bigpond.com/gajmcdonald/alilite/Mid.htm.
Ali-Lite Motorcycle Trailers; http://www.users.bigpond.com/gajmcdonald/alilite/Ultra.htm.
Motorcycle trailers and Motorcycle trailer hitches. Trailers by Uni-go.; http://www.uni-go.com/trailer/index.html (pp. 1-2).
Turtle hull Trailers; http://turlehulltrailers.com.
Trailmaster, Inc.=Arizona Cargo Trailer; http://trailmasterinc.com/arizona.html.
Trailmaster, Inc.—Backpacker Cargo Trailer; http://trailmasterinc.com/cargo/backpack.html.
Trailmaster, Inc.—CM1000 Cargo Trailer by CycleMate; http://trailmasterinc.com/cargo/cm1000.html.
Trailmaster, Inc.—CM2000 Cargo Trailer by CycleMate; http://trailmasterinc.com/cargo.cm2000.html.
Trailmaster, Inc.—CM2000 LTD Cargo Trailer by CycleMate; http://trailmasterinc.com/cargo/cm2000ltd.html.
Trailmaster, Inc.—TourPack 'King'; http://trailmasterinc.com/cargo/tpk.html.
Trailmaster, Inc.—WindRaider Cargo Trailer by CycleMate; http://trailmasterinc.com/cargo/windraid.html.
Trailmaster, Inc.—Zephyr Cargo Trailer by CycleMate; http://trailmasterinc.com/cargo/zephyr.html.
http://www.tourmaster.nl/Engles_Duits/images/binnenkant_TM600.jpg.
http://www.tourmaster.nl/Engels_Duits/images/Freebird.jpg.
http://www.tourmaster.nl/Engels_Duits/images/Singa_met_Scootmaster.jpg.
http://www.tourmaster.nl/Engels_Duits/images/ToolMaster.jpg.
http://www.tourmaster.nl/Engels_Duits/images/TM150_met_dekzeil.jpg.
http://www.tourmaster.nl/Engels_Duits/images/TM350_met_accessories.jpg.
http://www.tourmaster.nl/Engels_Duits/images/TourMaster2000.jpg.
http://www.tntmotocorp.com/trailerpix5.html.
Motorcycle Cargo Trailer, R&W Trailers, Inc.; http://r-wtrailers.com/ (pp. 1-2).
Motorcycle Custom Trailers, Cargo, Sleepers; Quicksilver; http://quicksilvertrailers.com/mbikes.htm (pp. 1-2).
The N-Line Trailer; http://n-line.com/trailers.htm (pp. 1-2).
Starlight Models; http://www.neoshotrailers.com/models.html (pp. 1-2).
MC Touring Products; http://www.mctouringproducts.com/trailer/features.html (pp. 1-3).
Kurzer Trialers; http://kruzertrailers.com/models.html.
Jak-Nel Trailers; http://www.jak-neltrailers.com/product.html (pp. 1-2).
The ultimate design cargo trailers, fast and sleek; http://www.inb.net/hannigan/new%20pages/trailers.html (pp. 1-3).
photo; http:/www.fibroconcept.com/en/produits/imagepopup.cfm?i+Voy%2Db%5Fnoir%Douvert%5F . . .
Dutchman's trailers specifications; http://www.dutchmans.com/Specs.htm.
White trailer 4; http://www.dutchmans.com/white_trailer_4.htm.
Black trailer 3; http://www.dutchmans.com/black_trailer_3.htm.
Motorcycle trailers from Ric Andrews; http://dropbears.com/r/ricandrews/trailer2.htm.
Photo; http://www.dauntlessmotors.com/Mountinghdw_files/images/zztrailers/zz2000lttrailerlr6.03.JPG.
Photo; http://dauntlessmotors.com/Mountinghdw_files/images/uni-gobluekawaconcorsetopl . . .
The PEAK Sport-Touring Cargo Trailer; http://www.dauntlessmotors.com/peak.htm (pp. 1-6).
Motorcycle/small car cargo trailers; http:/www.wikco.com/cargot1.html (pp. 1-6).
Motorcycle trailers, touring trailers, fiberglass molds; http://www.aeroburne.com/motorcycletrailers2.htm (pp. 1-7).
Product list; Cycle-Mate; http://cycle-mate.com/trailers/default/asp.
Country Trailers; http://countrytrailers.net/.
Com-Pac-Camp; http://www.com-pac-camp.com/pop_ups/gallery3_4.htm.
Photo; http://www.cellco.ca/redtrail.jpg.
Photo; http://www.cellco.ca/whittrail.jpg.
California Side Car; http://www.californiasidecar.com (5 pages).
Bushtec Performance Trailer Models; http://bushtec.com/models.html (pp. 1-3).
Burro Products—Baby Burro; http://www.burroproductsinc.com/babyburro.html.
Burro Products—Little Burro; http://www.burroproductsinc.com/littleburro.html (pp. 1-2).
The Angel Design; http://www.angeltrailer.com/pages/3/page3.html?refresh=1071340030879.
American Legend Home; http://www.american-legend.com/features/features.html (pp.1-2).
Models: Legend; http://www.american-legend.com/models/models_legend.html (pp. 1-2).
Models: Sport; http://www.american-legend.com/models/models_sport.html (pp. 1-2).

* cited by examiner

MOTORCYCLE TRAILER

CROSS-REFERENCE TO RELATED APPLICATIONS

None

STATEMENTS REGARDING FEDERALLY SPONSORED RESEARCH OR DEVELOPMENT

None

REFERENCE TO A MICROFICHE APPENDIX

None

BACKGROUND OF THE INVENTION

1. Field of the Invention

The present invention relates to motorcycle trailers. More specifically, it relates to trailers that have an aerodynamically-designed storage compartment, a suspension spring assembly for the hitch and draw bar to reduce the impact on the motorcycle from the trailer's reaction to bumps, and to two-wheel independent suspension where each suspension mount on the trailer is above the axle of each tire. Such mounting of the swing arm reduces vertical acceleration associated with the wheel hitting a bump, resulting in decreased vertical forces on the trailer. In addition to the independent suspension, the suspension spring assembly for the hitch and draw decrease the transfer of vertical force to the motorcycle.

2. Description of the Related Art

There are a large number of motorcycle trailers on the market that try to have improved aerodynamic characteristics. One method to improve aerodynamics changes the shape of the trailer so that the front of the trailer has a somewhat pointed nose. This design causes the air to flow easily underneath or over the top of the trailer. However, the prior art designs typically leave the back end of the trailer square, which does nothing to direct the convergence of air around the back of the trailer. Another method of improving the aerodynamic characteristics of the trailer involves decreasing the size of the trailer such that it is smaller than the motorcycle so that the motorcycle diverts most of the wind. This approach has the obvious drawback of reducing the available cargo room.

While there is prior art using independent suspension systems to make the ride of the trailer smoother over rough roads, these suspension systems typically include swing arms that are below the wheel's axle. When the swing arm is below the wheel's axle, it must rise more steeply when it hits a bump and therefore there is a rougher ride due to higher vertical acceleration. For instance, U.S. Pat. No. 4,536,001 (Wagner) shows a two-wheel independent suspension motorcycle cargo trailer. In this trailer, there is a low center of gravity and an independent suspension system for each wheel instead of a transverse common axle and suspension for both wheels. The low center of gravity and independent suspension were purported to reduce drag and provide a smoother ride. In Wagner, the wheel suspension consists of a swing arm and air shocks to reduce the effects of bumps in the road. However, the swing arm is mounted on the trailer in a location lower than the attachment to the wheel axle.

Finally, the motorcycle trailer currently on the market use a single rigid hitch and drag bar which resists the vertical motion of the motorcycle going over bumps. This mechanism transfers the vertical motion of the trailer to the motorcycle, which makes the motorcycle more difficult to control, reduces the enjoyment of the ride, and increases the fatigue of the rear frame of the motorcycle.

BRIEF SUMMARY OF THE INVENTION

The present invention is a motorcycle cargo pull trailer which incorporates an aerodynamically-designed storage compartment, an independent two-wheel suspension, and an independent suspension for the hitch. The storage compartment comprises a front panel which combines with the front portions of the side, top, and bottom panels to create an aerodynamic suction on the trailer as the air flow over these accelerates over these curving surfaces. The rear panel combines with the rear portions of the side, top, and bottom panels to create a tapering effect which creates thrust on the rearward portion of the trailer as a result of the recompression of the decelerating air as it passes over the trailer. The overall shape of the storage compartment gives the trailer its improved aerodynamic characteristics.

A suspension spring supported hitch and drawbar design enables the trailer to move up and down in the pitch axis and reduce the effect on the towing motorcycle. The two-wheel independent suspension incorporates wheel suspension shock absorbers attaching the chassis to swing arms mounted above the wheel axles. By positioning the swing arm above the wheel axles, the rough ride normally caused when a trailer hits a bump in the road is significantly reduced.

DETAILED DESCRIPTION OF THE INVENTION

Figure 3A:
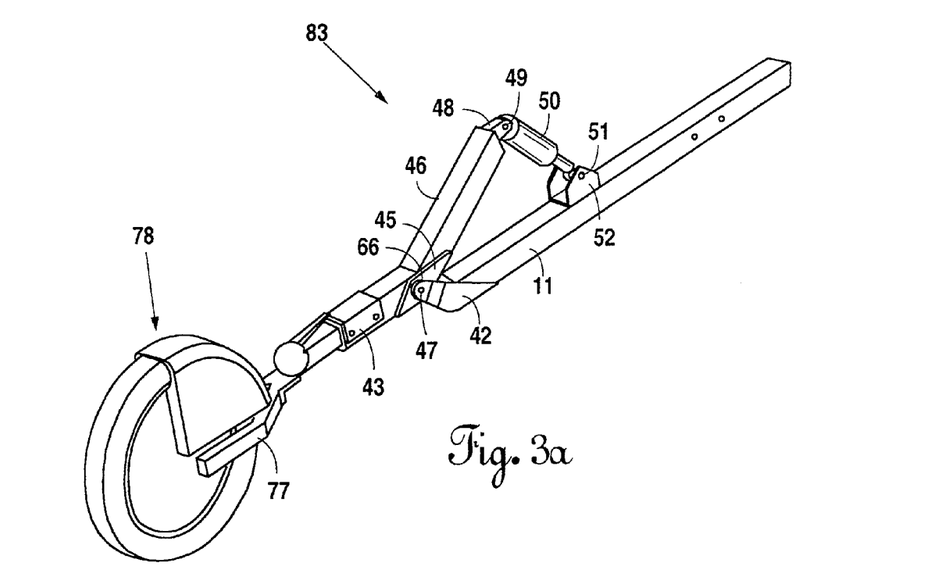
FIG. 3a is an elevational view of the left side of the suspension spring supported hitch coupler connected to center support of the trailer frame.
Figure 3B:
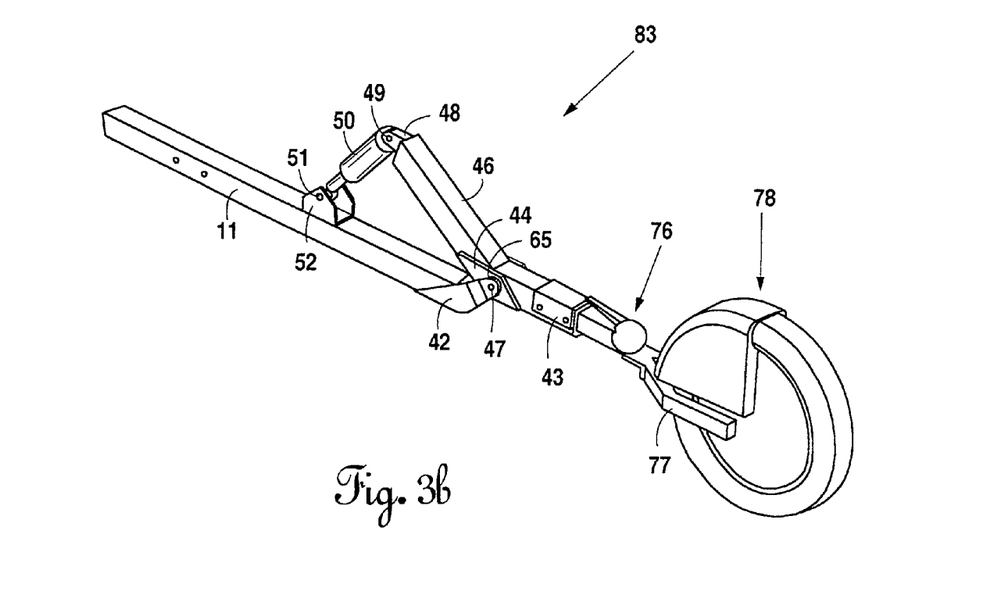
FIG. 3b is an elevational view of the right side of the suspension spring supported hitch coupler connected to center support of the trailer frame.
Figure 4:
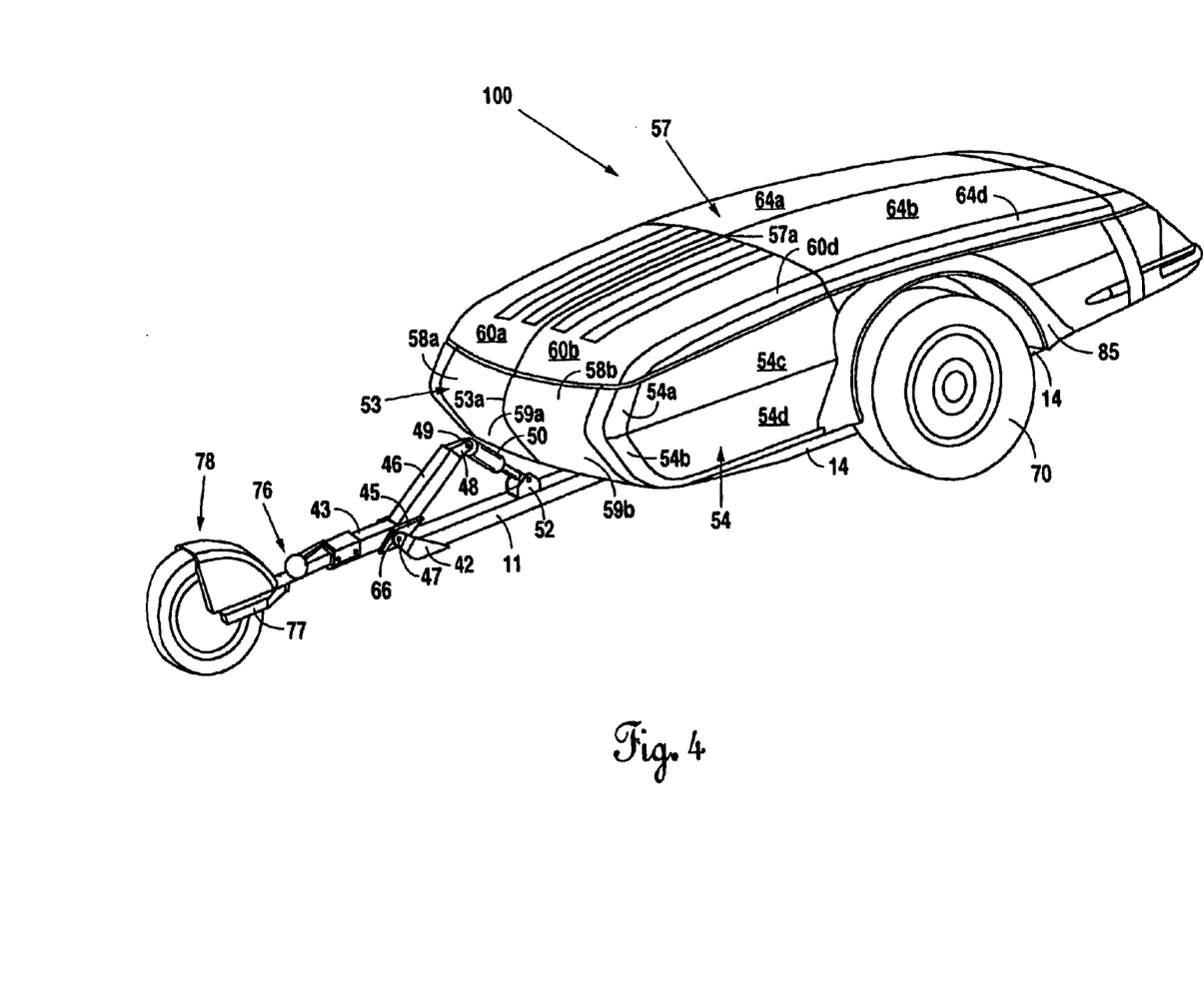
FIG. 4 is an elevational view of the trailer frame with the storage compartment attached.

FIG. 4 shows an isometric view of the present invention, an aerodynamically-designed portable trailer that can be pulled behind a motorcycle. The trailer is comprised of storage compartment 100 attached to trailer frame 10 (shown in FIG. I). Attached to the frame is an independent suspension system for the left tire and an independent suspension system for the right tire and spring supported hitch coupler 83 (shown in FIGS. 3a and 3b), which isolates the towing vehicle 78 from the movement of the trailer over an uneven road surface.

Figure 1:
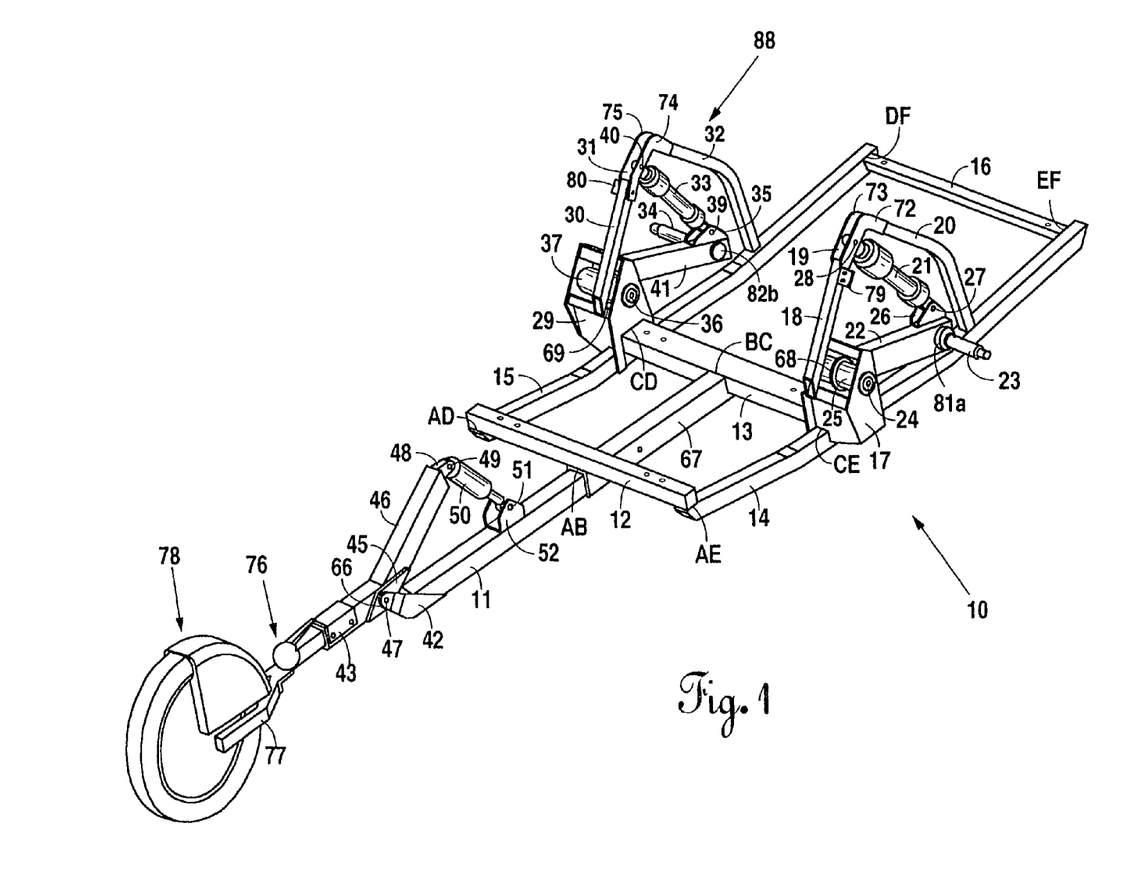
FIG. 1 is an elevational view of the frame, the hitch coupler, and the suspension systems of the trailer.
Figure 7:
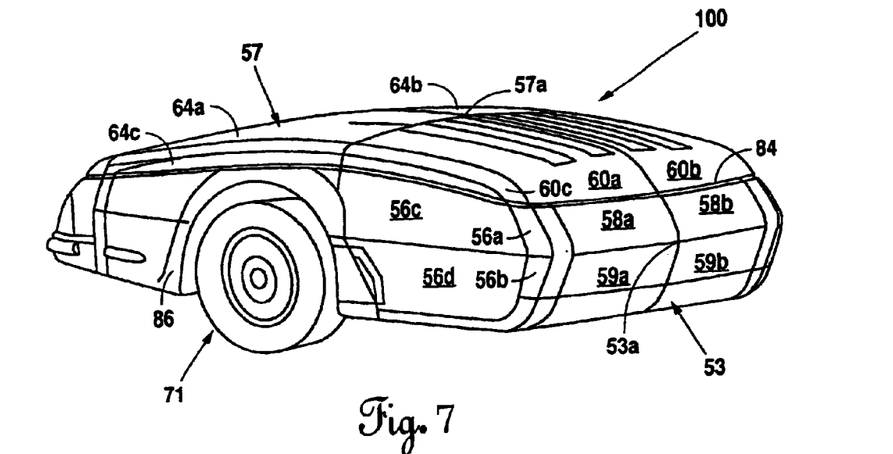
FIG. 7 is an elevational view from the right-front perspective of the storage compartment with tire attached.

As shown in FIG. 1, trailer frame 10 has second connector 11 made up of a hollow square or rectangular beam. Second connector 11 inserts into center support bar 67 at reference point AD. Trailer frame 10 has two side support rails 15 and 14 that run horizontally on the right and left sides of center support bar 67 respectively. Front lateral support bar 12 crosses center support bar 67 perpendicularly at reference point AB and is attached at that point. The forward most end of side support rail 15 is attached to the bottom, right end of front lateral support bar 12 at reference point AD, and runs perpendicularly away from front lateral support bar 12 toward the rear of the trailer. The forward most end of side support rail 14 is attached on the bottom and left end of front lateral support bar 12 at reference point AE, and runs perpendicularly away from the front lateral support bar 12 toward the rear of the trailer. Side support rails 14 and 15 are tapered inward toward the center line as defined by center support bar 67. Middle lateral support bar 13 attaches to support rails 14 (at reference point CE) and 15 (at reference point CD) as well as at the end of center support bar 67 at reference point BC. Center support bar 67 does not extend to the rear of the trailer frame; it ends at a point forward of left tire 70 (shown on FIG. 5) and right tire 71 (shown on FIG. 7). Middle lateral support bar 13 extends beyond both of the side support rails 14 and 15 in order to accommodate the attachment of swing arm pivot mount structures 17 and 29. Rear lateral support bar 16 attaches to the rear end of the side support rails 14 (at reference point EF) and 15 (at reference point DF). Rear lateral support bar 16 runs transversely between side support rails 14 and 15.

Figure 2:
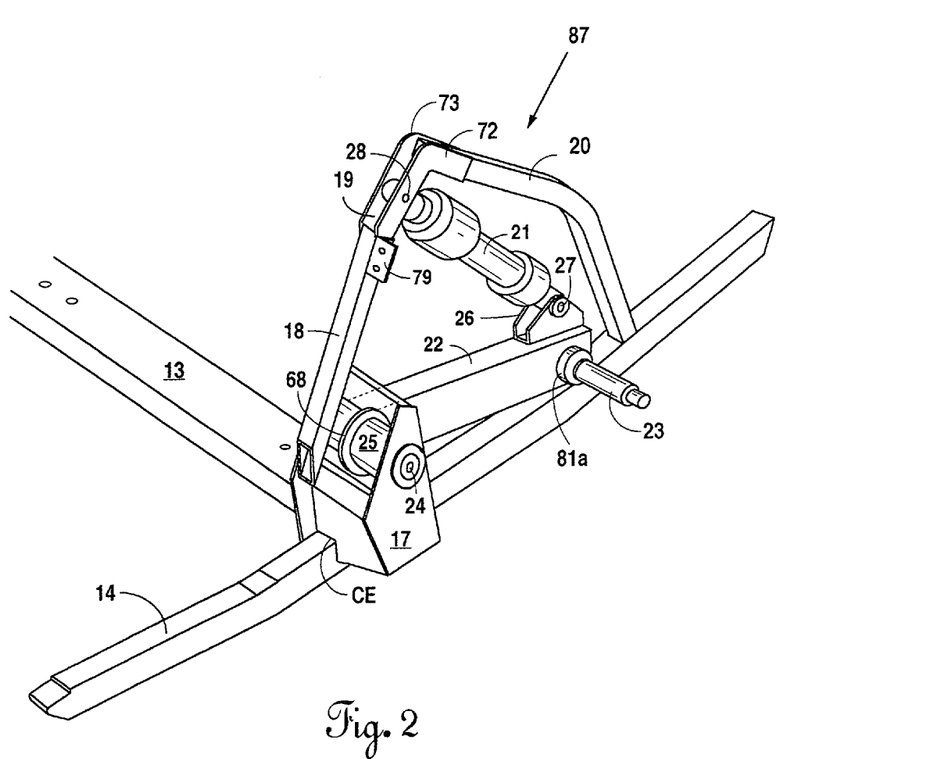
FIG. 2 is an elevational view of the left tire suspension and the support arch for that suspension.

FIG. 2 shows the left wheel independent suspension system. Swing arm mount structure 17 extends vertically from the left end of middle lateral support bar 13, with an opening extending toward the rear of the trailer. Swing arm 22 is comprised of a first end and second end. The first end is connected to the swing arm mount structure 17 by pivot pin 24 and bushing set 25 and 68. The second end is connected to axle 23 by weld rings 81a and 81b (not shown) on the left and right sides of swing arm 22, respectively. When suspension shock absorber 21 is in its equilibrium state (neither compressed nor extended), the swing arm slopes downward from its first end toward its second end, that is pivot pin 24 is above axle 23. When trailer is in motion, suspension shock absorber 21 will compress and extend to allow axle 23 and swing arm 22 to move upward and downward about pivot pin 24.

Continuing in FIG. 2, the forward end of support 18 is attached (welded) to the right front portion of swing arm mount structure 17 and extends upward and toward the rear of the trailer. On the rearward end of support 18, adaptor 19 attaches support 18 to the forward end of leg 20. Adaptor 19 is comprised of right and left angled flat sections 73 and 72 respectively. Sections 73 and 72 of adaptor 19 extend from rearward end of support 18 and then make an angle down and to the rear of the trailer toward the forward end of leg 20. The rearward end of leg 20 attaches to side support rail 14. The connection of support 18, adaptor 19, and leg 20 creates a support arch 87 from swing arm mount structure 17 to side support rail 14. Suspension shock absorber 21 is connected from adaptor 19 (by connecting pin 28) to swing arm connector 26 (by connecting pin 27). Swing arm connector 26 is mounted on the top of the second end of swing arm 22. Support arch 87 is attached to storage compartment 100 at the intersection of adaptor 19 and support 18 by bracket 79. The combination of swing arm mount structure 17, swing arm 22, suspension shock absorber 21, and support arch 87 form the suspension system for the left tire 70 (shown in FIG. 4).

The suspension system for the right tire is a mirror image of the left side tire suspension system and is best shown in FIG. 1. Swing arm mount structure 29 extends vertically from the right end of middle lateral support bar 13, with an opening extending toward the rear of the trailer. Swing arm 41 is comprised of a first end and second end. The first end is connected to the swing arm mount structure 29 by pivot pin 36 and bushing set 37 and 69. The second end is connected to axle 34 by weld rings 82a (not shown) and 82b on the right and left sides of swing arm 41, respectively. When suspension shock absorber 33 is in its equilibrium state (neither compressed nor extended), the swing arm slopes downward from its first end toward its second end, that is pivot pin 36 is above axle 34. When trailer is in motion, suspension shock absorber 33 will compress and extend to allow axle 34 and swing arm 41 to move upward and downward in relation to one another.

The forward end of support 30 is attached (welded) to the left front portion of swing arm mount structure 29 and extends upward and toward the rear of the trailer. On the rearward end of support 30, adaptor 31 attaches support 30 to the forward end of leg 32. Adaptor 31 is comprised of right and left angled flat sections 75 and 74 respectively. Sections 75 and 74 of adaptor 31 extend from rearward end of support 30 and then make an angle down and to the rear of the trailer toward the forward end of leg 32. The rearward end of leg 32 attaches to side support rail 15. The connection of support 30, adaptor 31, and leg 32 creates a support arch 88 from swing arm mount structure 29 to side support rail 15. Suspension shock absorber 33 is connected from adaptor 31 (by connecting pin 40) to swing arm connector 35 (by connecting pin 39). Swing arm connector 35 is mounted on the top of the second end of swing arm 41. Support arch 88 is attached to storage compartment 100 at the intersection of adaptor 31 and support 30 by bracket 80. The combination of swing arm mount structure 29, swing arm 41, suspension shock absorber 33, and support arch 88 form the suspension system for the right tire 71 (shown in FIG. 7).

FIGS. 3a and 3b show the manner in which spring-supported hitch coupler connects the trailer frame to the towing vehicle. Second connector 11 attaches to bracket 42 that angles up and toward the front of the trailer hitch. First connector 43 is attached to first connector support 46 (which angles up and toward the rear of the trailer) by welding both pieces to parallelogram brackets 44 and 45 on the right and left sides of first connector 43 and first connector support 46, respectively. Pivot rod 47 passes through bushing mounts 65 and 66, bracket 42, parallelogram brackets 44 and 45, first connector 43, and first connector support 46. This pivot point allows second connector 11 to move independently from hitch coupler 83. First connector 43 comprises an industry standard connector used to attach a trailer to the towing ball 76 of the towing vehicle 78. Towing ball 76 is attached to towing vehicle 78 by towing hitch 77. First connector support 46 is attached (welded) to connection piece 48 which is then connected to shock absorbing spring 50 by pin 49. Shock absorbing spring 50 angles down and to the rear and is attached to second connector 11 by pin 51 and connector 52. Connector 52, in turn, is attached to the top of second connector 11. Shock absorbing spring 50 and the pivot rod 47 enables the trailer to move up and down without moving the towing vehicle 78 a great amount, thereby decreasing the transfer of vertical forces.

Figure 11:
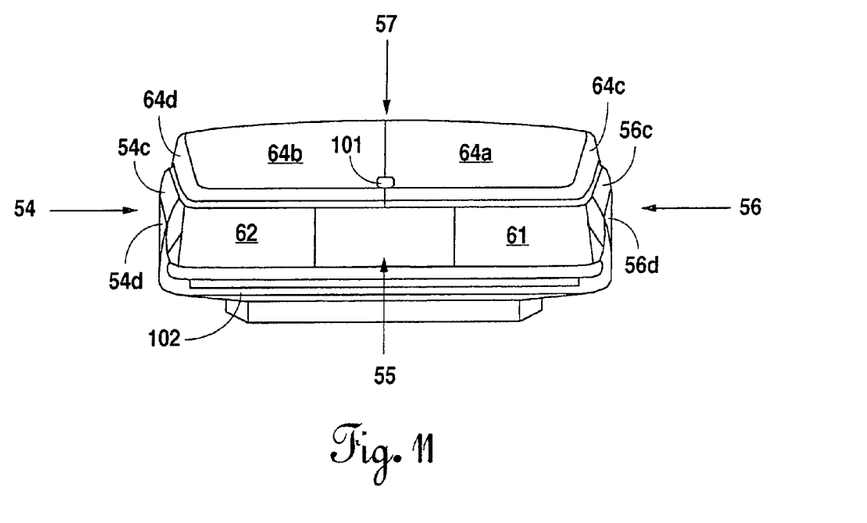
FIG. 11 is a rear view of the storage compartment.
Figure 12:
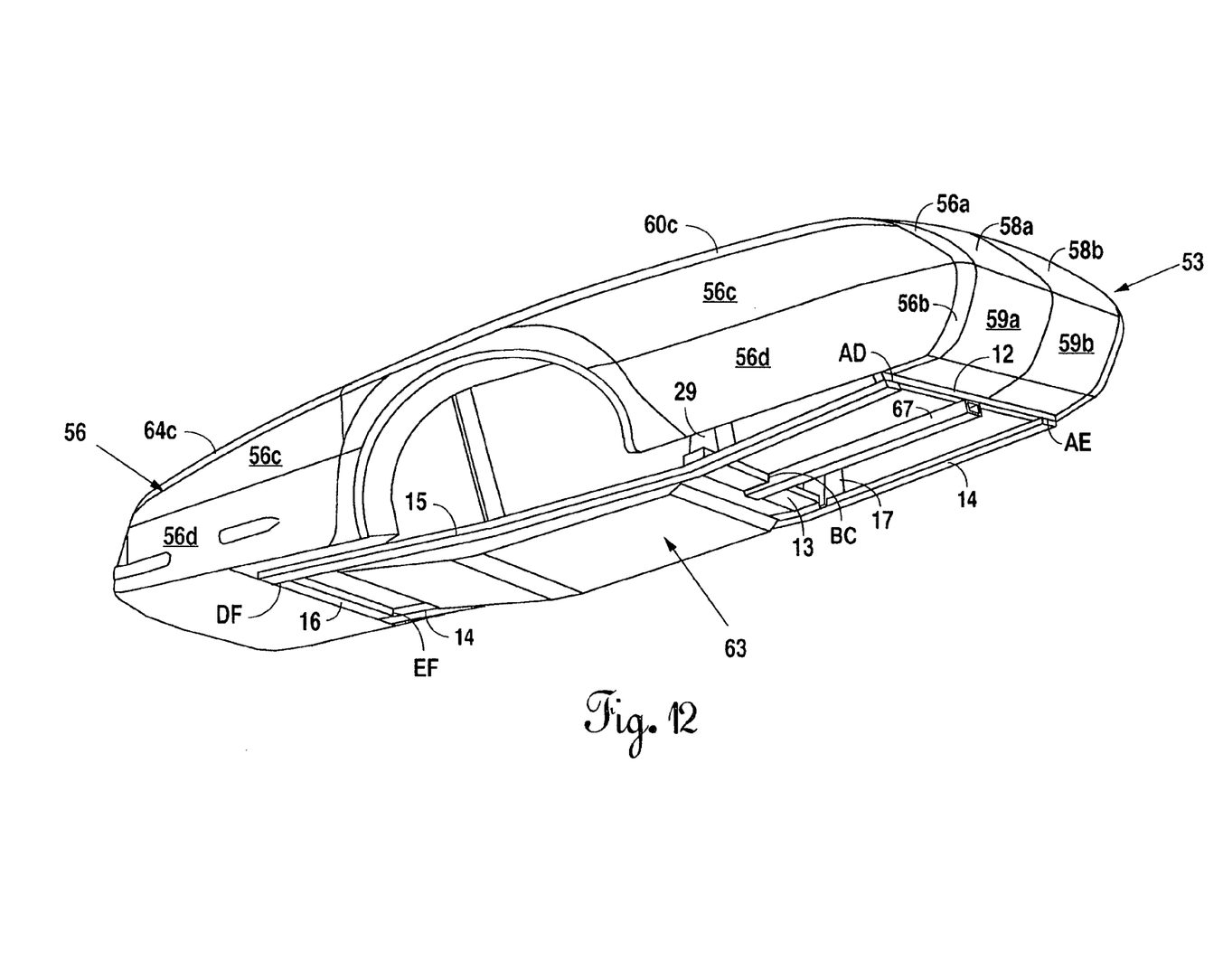
FIG. 12 is an elevational view of the bottom-right perspective of the storage compartment mounted on a portion of the frame.

FIGS. 5 through 12 illustrate storage compartment 100 from various perspectives, both separated and connected to trailer frame 10. Storage compartment 100 is comprised of front section 53 (FIG. 8), left side section 54 (FIG. 5), right side section 56 (FIG. 6), top section 57 (FIG. 9), rear section 55 (FIG. 11), and bottom section 63 (FIG. 12). Left side section 54 is on the left side of storage compartment 100 and has a hub cutout for left tire 70. Left fender 85 is attached around the cutout for left tire 70 on the left side section 54. Right side section 56 is on the right side of storage compartment 100 and has a hub cutout for right tire 71. Right fender 86 is attached around the cutout for right tire 71 on the right side section 56. Bottom section 63 of the storage compartment 100 is attached to the bottom edge of portions 59a and 59b of front section 53, as well as the bottom edges of side sections 54 and 56 and rear 55. Bottom 63 is also attached to the chassis along the front lateral support bar 12, the middle lateral support bar 13, and the brackets 79 and 80 (shown in FIGS. 1 and 2).

Figure 8:
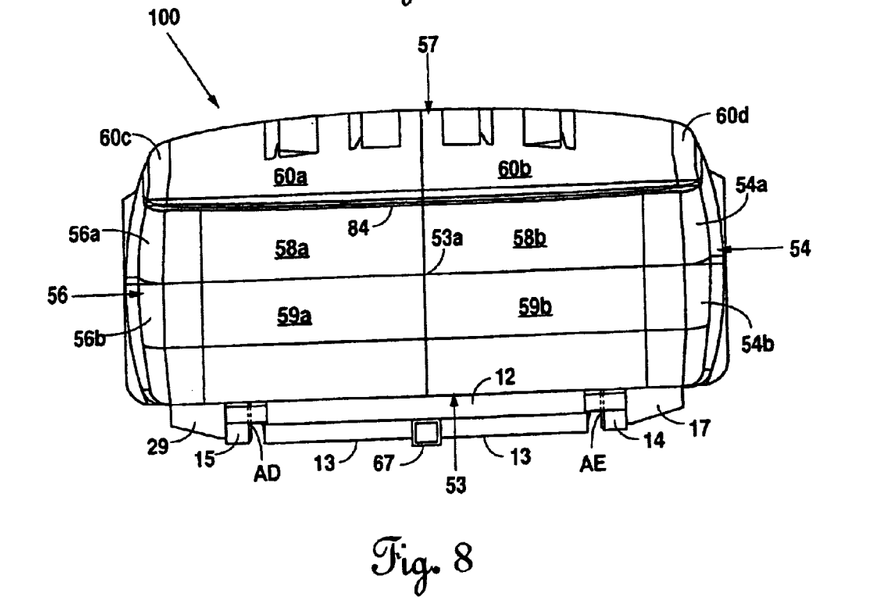
FIG. 8 is a front view of the storage compartment.

Referring to FIG. 8, the front section 53 of the storage compartment has a first front panel member 58 with portions 58a and 58b as well as a second front panel member 59 with portions 59a and 59b. Reference point 53a is the point of intersection of portions 58a, 58b, 59a, and 59b of the front section 53. From reference point 53a portion 58a slopes up and to the rear of storage compartment 100 vertically toward the top 57 along the line of intersection of portions 58a and 58b and out and to the rear of storage compartment 100 horizontally toward the right side section 56 along the line of intersection of portions 58a and 59a. The point of intersection between front section 53, right side section 56, and top 57 is the point of portion 58a that is the most up and to the rear of storage compartment 100 from point 53a. From reference point 53a portion 58b slopes up and to the rear of storage compartment 100 vertically toward top 57 along the line of intersection of portions 58a and 58b and out and to the rear of storage compartment 100 horizontally toward left side section 54 along the line of intersection of portions 58b and 59b. The point of intersection between front section 53, left side section 54, and top 57 is the point of portion 58b that is the most up and to the rear of storage compartment 100 from point 53a. From reference point 53a portion 59a slopes down and to the rear of storage compartment 100 vertically toward bottom 63 along the line of intersection of portions 59a and 59b and out and to the rear of storage compartment 100 horizontally toward right side section 56 along the line of intersection of portions 58a and 59a. The point of intersection between front section 53, right side section 56, and the bottom 63 is the point of portion 59a that is the most below and to the rear of storage compartment 100 from point 53a. From reference point 53a portion 59b slopes down and to the rear of storage compartment 100 vertically toward bottom 63 along the line of intersection of portions 59a and 59b and out and to the rear of storage compartment 100 horizontally toward left side section 54 along the line of intersection of portions 58b and 59b. The point of intersection between front section 53, left side section 54, and bottom 63 is the point of portion 59b that is the most below and to the rear of storage compartment 100 from point 53a. The sloping of portions 58a, 58b, 59a and 59b of storage compartment 100 combine as a rounding effect to create aerodynamic suction.

Figure 5:
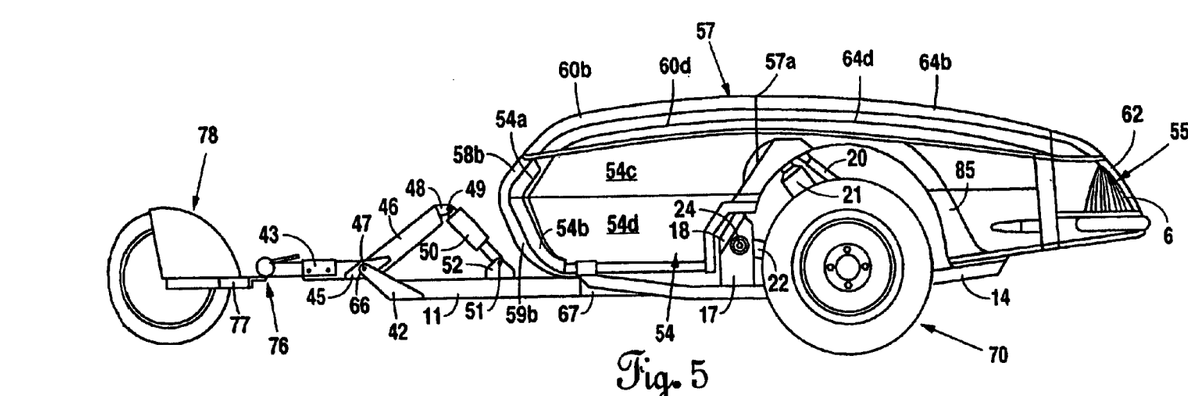
FIG. 5 is a left side view of the trailer frame with the storage compartment attached.

Referring to FIG. 5, left side section 54 is made up of portions 54a, 54b, and 54c, and 54d. Portion 54a, finishes the sloping of 58b into portion 54c (rounding the top edge between first front panel member 58 and left side section 54), and portion 54b finishes the sloping of 59b into portion 54d (rounding the bottom edge between second front panel member 59 and left side section 54). Portion 54c slopes up and to the center toward top 57 from the line of intersection of portions 54c and 54d, while 54d slopes down and to the center toward bottom 63 from the same line of intersection.

Figure 6:
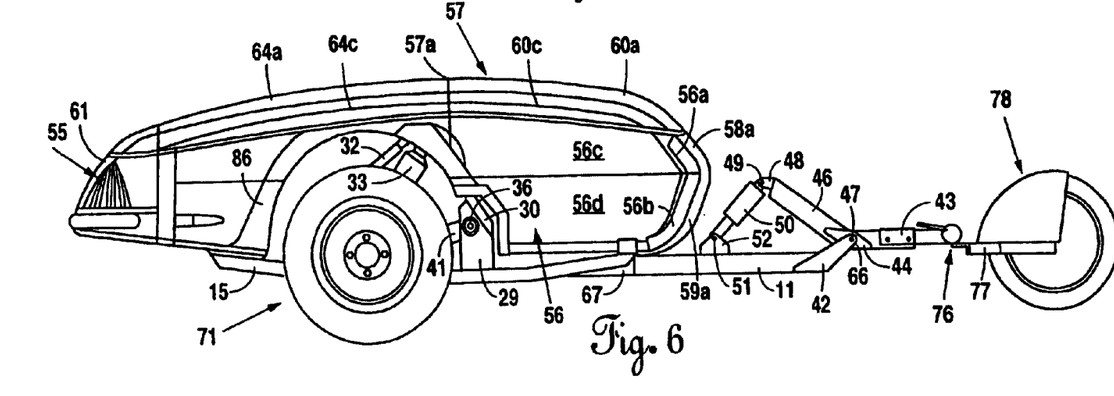
FIG. 6 is a right side view of the trailer frame with the storage compartment attached.

Referring to FIG. 6, right side section 56 is made up of portions 56a, 56b, and 56c, and 56d. Portion 56a finishes the sloping of 58a into portion 56c (rounding the top edge between first front panel member 58 and left side section 56), and portion 56b finishing the sloping of 59a into portion 56d (rounding the bottom edge between second front panel member 59 and left side section 56). Portion 56c slopes up and to the center toward top 57 from the line of intersection of portions 56c and 56d , while 56d slopes down and to the center toward bottom 63 from the same line of intersection.

Figure 9:
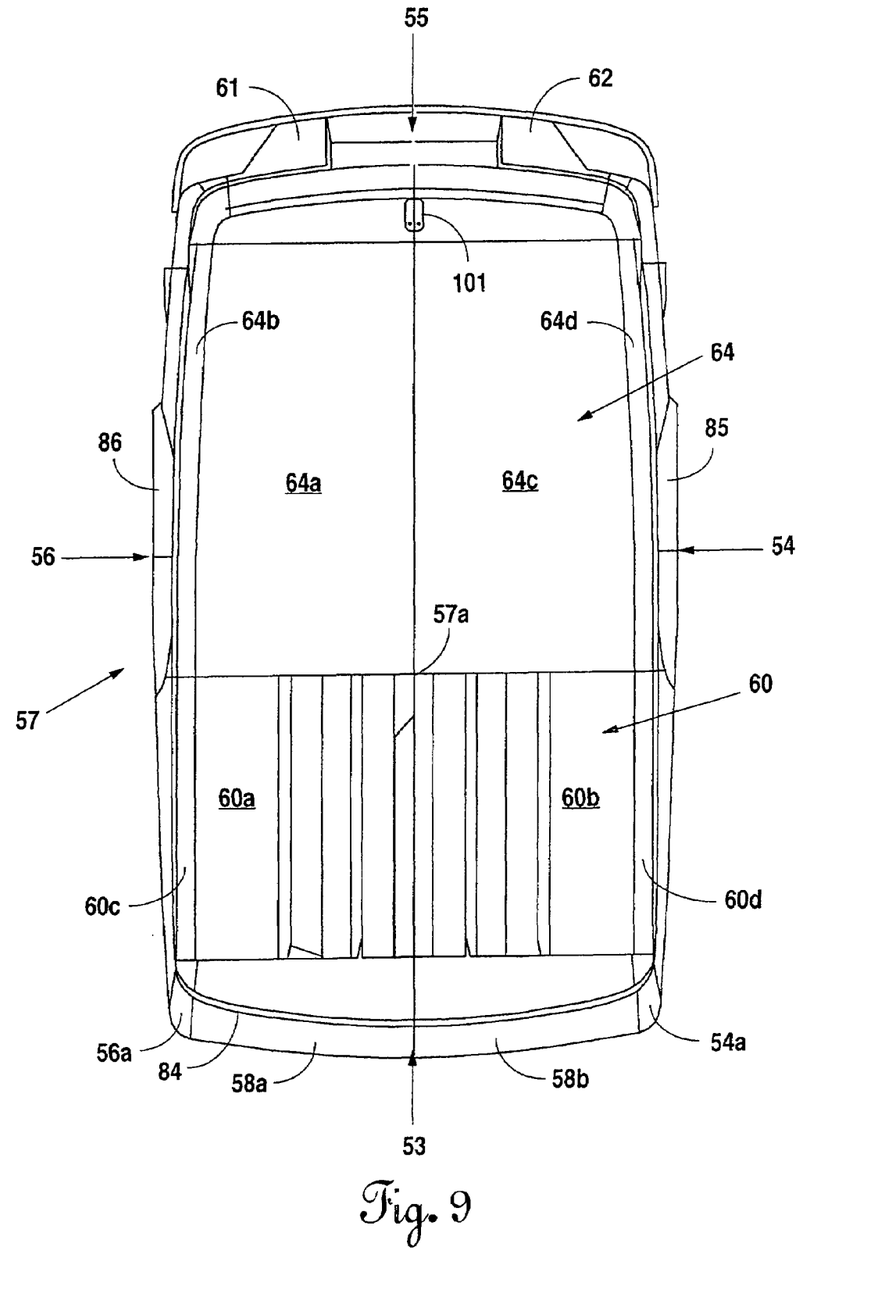
FIG. 9 is a top view of the storage compartment.
Figure 10:
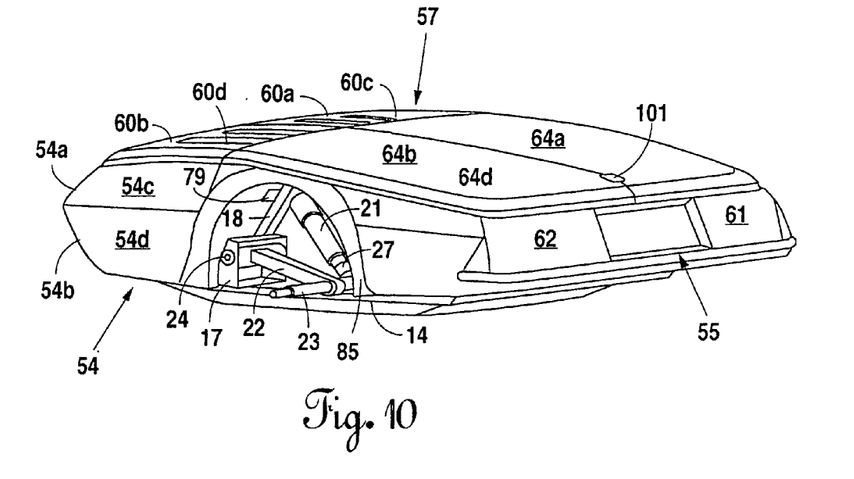
FIG. 10 is an elevational view of the left-rear perspective of the storage compartment with tire attached.

Referring to FIG. 9, top section 57 is composed of first upper panel member 60 which is made up of portions 60a, 60b, 60c and 60d, and second upper panel member 64, which is made up of portions 64a, 64b, 64c and 64d The front right portion 60a of top 57 continues the slope of portion 58a with a steep incline at the line of intersection between 58a and 60a and a less incline near the center of the front right portion 60a and the center of top 57. Front right portion 60a slopes down and to front section 53 from reference point 57a (in the middle of top 57) along the line of intersection between portions 60a and 60b. Front right portion 60a also slopes down and to right side section 56 from reference point 57a along the line of intersection between portions 60a and 64a. Portion 60c is on the right side of 60a and forms a steep rounded decline to right side section 56. Front left portion 60b of top 57 continues the slope of portion 58b with a steep incline at the line of intersection between 58b and 60b and a lesser incline near the center of front left portion 60b and the center of top 57 to reference point 57a at the intersection of top portions 60a, 60b, 64a and 64b which completes the rounding out of the aerodynamic suction. Front left portion 60b slopes down and to front section 53 from reference point 57a along the line of intersection between portions 60a and 60b. Front left portion 60b also slopes down and to the left side section 54 from reference point 57a along the line of intersection between portions 60b and 64b. Portion 60d is on the left side of 60b and forms a steep rounded decline to left side section 54. Back right portion 64a of top 57 starts at reference point 57a to taper down toward rear 55 along the line of intersection for back portions 64a and 64b, and down and to the right toward right side section 56. Portion 64c is on the right side of 64a and forms a steep rounded decline to right side section 56 so as to capture thrust from the recompressing air flow. Back left portion 64b of top 57 starts at reference point 57a to taper down toward rear 55 along the line of intersection for back portions 64a and 64b, and out and down to the left toward left side section 54. Portion 64d is on the left side of 64c and forms a steep rounded decline to left side section 54 so as to capture thrust from the recompressing air flow. The entire top section 57 attaches to front section 53 by a hinge 84 along the line of intersection between front section 53 and top 57, and latches at latch 101, which is located in the center of the line of intersection between rear 55 and top 57.

Referring to FIG. 11, rear section 55 is made up of right rear portion 61, and left rear portion 62. Rear portions 61 and 62 slope down and to the rear of storage compartment 100 starting from top 57 and going toward bottom 63, connecting with bottom 63 at reference point 102 to complete storage compartment 100.

FIG. 12 shows the bottom section 63.

Those skilled in the art can appreciate from the foregoing description that the broad teachings of the present invention can be implemented in a variety of forms. Therefore, while the present invention has been described in connection with particular examples thereof, the true scope of the invention should not be so limited since other modifications will become apparent to the skilled practitioner upon a study of the specification and following claims.

I claim:

1. A motorcycle trailer apparatus comprising:
   a frame means having a hitch coupler member for attaching to a motorcycle and an aerodynamic storage compartment mounted on the frame means;
   said hitch coupler member having a first connector for securing to a motorcycle, a second connector for securing to the trailer, wherein the second connector is pivotally connected to the first connector, a shock absorbing spring means pivotally connected to the second connector and positioned to dampen movement between the first and second connectors, and a rearwardly extending first connector support fixedly connected to the first connector and pivotally connected to the shock absorber and;
   left and right independent wheel suspension systems, wherein each independent wheel suspension system comprises an axle, a support arch, a swing arm mount structure, a shock absorber, and a swing arms further comprising a first end and second end wherein the first end pivotally attaches to the swing arm mount structures by way of a bushing set and the second end pivotally attaches to the axle wherein the second end is below the first end during normal operation.

2. The motorcycle trailer of claim 1 wherein the aerodynamic storage compartment comprises:
   a front section comprising a first front panel member inclined upwardly and curving rearwardly and a second front panel member extending downwardly and curving rearwardly at a angle less than the angle of the first front panel member to form a properly expanding front section of the storage compartment;
   a top section comprising a first upper panel member extending upwardly and rearwardly from the first front panel member and a second upper panel member extending downwardly and rearwardly from the first upper panel member to form a top of the storage compartment;
   a rear section comprising a rear panel member extending downwardly and rearwardly from the second upper portion to form a rear of the storage compartment;
   a bottom section comprising a bottom panel attaching to the frame;
   a left side section comprising an upper left panel member connecting to the first front panel member, the first upper panel member, the second upper panel member, and the rear panel member and a lower left panel member connecting to the second front panel, the bottom panel and the rear panel, wherein the upper left panel member slopes upwardly and toward the right of the storage compartment and the lower left panel member slopes downwardly and toward the right of the storage compartment; and
   a right side section comprising an upper right panel member connecting to the first front panel member, the first upper panel member, the second upper panel member, and the rear panel member and a lower right panel member connecting to the second front panel, the bottom panel and the rear panel, wherein the upper right panel member slopes upwardly and toward the left of the storage compartment and the lower right panel member slopes downwardly and toward the left of the storage compartment.

3. The motorcycle trailer of claim 2 further comprising:
   rounded corners panels at the junction of each section of the aerodynamic storage compartment to produce gradual acceleration and deceleration of the air flow to reduce aerodynamic drag.

4. The motorcycle trailer of claim 3 wherein the panels are made of aerodynamic material.

* * * * *